United States Patent [19]

Convis et al.

[11] 4,328,561
[45] May 4, 1982

[54] ALPHA CONTENT MATCH PRESCAN METHOD FOR AUTOMATIC SPELLING ERROR CORRECTION

[75] Inventors: Danny B. Convis, Washington Grove; David Glickman, Frederick; Walter S. Rosenbaum, Bethesda, all of Md.

[73] Assignee: International Business Machines Corp., Armonk, N.Y.

[21] Appl. No.: 108,000

[22] Filed: Dec. 28, 1979

[51] Int. Cl.³ .................. G06K 9/00; G06F 11/00
[52] U.S. Cl. .................. 364/900; 340/146.3 ED; 340/146.3 WD; 364/518
[58] Field of Search ... 364/200 MS File, 900 MS File, 364/518; 400/63, 74; 340/146.3 WD, 146.3 ED

[56] References Cited

U.S. PATENT DOCUMENTS

| | | | |
|---|---|---|---|
| 3,969,698 | 7/1976 | Bollinger et al. | 340/146.3 WD |
| 3,995,254 | 11/1976 | Rosenbaum | 340/146.3 WD |
| 4,010,445 | 3/1977 | Hoshino | 340/146.3 WD |
| 4,136,395 | 1/1979 | Kolpek et al. | 400/63 |

*Primary Examiner*—Leo H. Boudreau
*Attorney, Agent, or Firm*—John W. Henderson, Jr.

[57] ABSTRACT

A system for reducing the computation required to match a misspelled word against various candidates from a dictionary to find one or more words that represent the best match to the misspelled word. The major facility offered is the ability to computationally discern the degree of apparent match that exists between words that do not perfectly match a given target word without requiring the computationally tedious procedure of character by character positional matching which necessitates shifting and realignment to accommodate for differences between the candidate and target words due to character differences or added and dropped syllables. The system includes a method for storing and retrieving words from the dictionary based on their likelihood of being the correct version of a misspelled word and then reviewing those words further using the Prescan Alpha Content Match to reduce the number of candidates that must then be examined in a high resolution positional match to find the candidate(s) which matches the misspelled word with the greatest character affinity. The Prescan Alpha Content Match reduces the number of candidates in contention so as to make a high resolution match computationally feasible on a real-time basis.

2 Claims, 2 Drawing Figures

ALPHA CONTENT MATCH PRESCAN METHOD FOR AUTOMATIC SPELLING ERROR CORRECTION

BACKGROUND OF THE INVENTION

1. Field of the Invention

This invention relates to text processing and, more particularly, to methods for automatically prompting an operator with the correct spelling of a misspelled word.

2. Description of the Prior Art

In implementing a practical automatic spelling aid system the ultimate number of words that must be examined by a high resolution match algorithm which adjusts for aliased characters and dropped or added characters/syllables determines the practicality of the system in terms of both cost and efficiency of operation.

Procedures have been evolved in the prior art for reducing the number of candidate words that must be examined relative to a target misspelled word to find the best matched candidate or candidates. One technique involves only looking at those words which match the misspelled word in its first character and are not greater or less in length than it by more than two characters. This approach is based on the supposition that the most reliable character in a misspelled word is always the first character and that normal misspelling would not yield more than a two-character addition or deletion.

A second technique for reducing the number of candidates that must be examined relative to a target misspelled word to determine the best matched candidate requires use of a vector fetch approach which assigns to each word in the dictionary a magnitude value based on the confusibility of the characters in the word where a character's weight in the magnitude computation is clustered close to those characters that it could be aliased as. Only those words in the magnitude "range" of the misspelled word are retrieved.

A third technique for reducing the number of candidates that must be examined relative to a target misspelled word to determine the set of best matched candidates is to examine all words of equal length to the misspelled word or within plus or minus two character positions regardless of first character.

However, because the dictionary size may be quite large (i.e., many times over 50,000 words), even a discriminant which will preclude 99% of the dictionary from review will still lead to a large set of words which must be examined to determine the best match candidates relative to a misspelled word. The first technique, although effective, leads to non-recoverable errors when the first character is in error and normally does not have a discrimination potential greater than 90%. The second technique has a higher average discrimination potential using the Cluster Storage Apparatus disclosed in U.S. Pat. No. 3,969,698, but still yields more than 1% of the dictionary for final review. The combination of the first and second techniques with the double storing of words that have highly ambiguous or silent first characters, (e.g., "philosophy" under the "P" and under "F", "knot" under "K" and under "N"); together yields a discrimination potential of roughly 99%. This, however, as mentioned, still leaves for large dictionaries more words than can be conveniently handled in a real time manner for discrimination of the best candidate matches against a target misspelled word. The further discrimination using an independent criteria not used above is required to additionally reduce the word list down to a size that can be conveniently processed in a real-time manner to determine the best candidate match(es) against a target misspelled word. This problem is further accentuated by the fact that after 99% of the words have been discriminated, the remaining one percent tend to be more homogeneous in content and therefore, less amenable to cursory methods of examination and further culling.

SUMMARY OF THE INVENTION

It has been discovered that the alpha content of words resulting from a fetched discrimination using match on first alpha character and vector magnitude range can be further discriminated by inventorying, without regard to position, the respective characters in the misspelled words and in each of the dictionary candidate words where a candidate word is dismissed from additional processing if there is not a predetermined percentage match between its character content and that of the misspelled word.

DESCRIPTION OF THE PREFERRED EMBODIMENT

Figure 1:
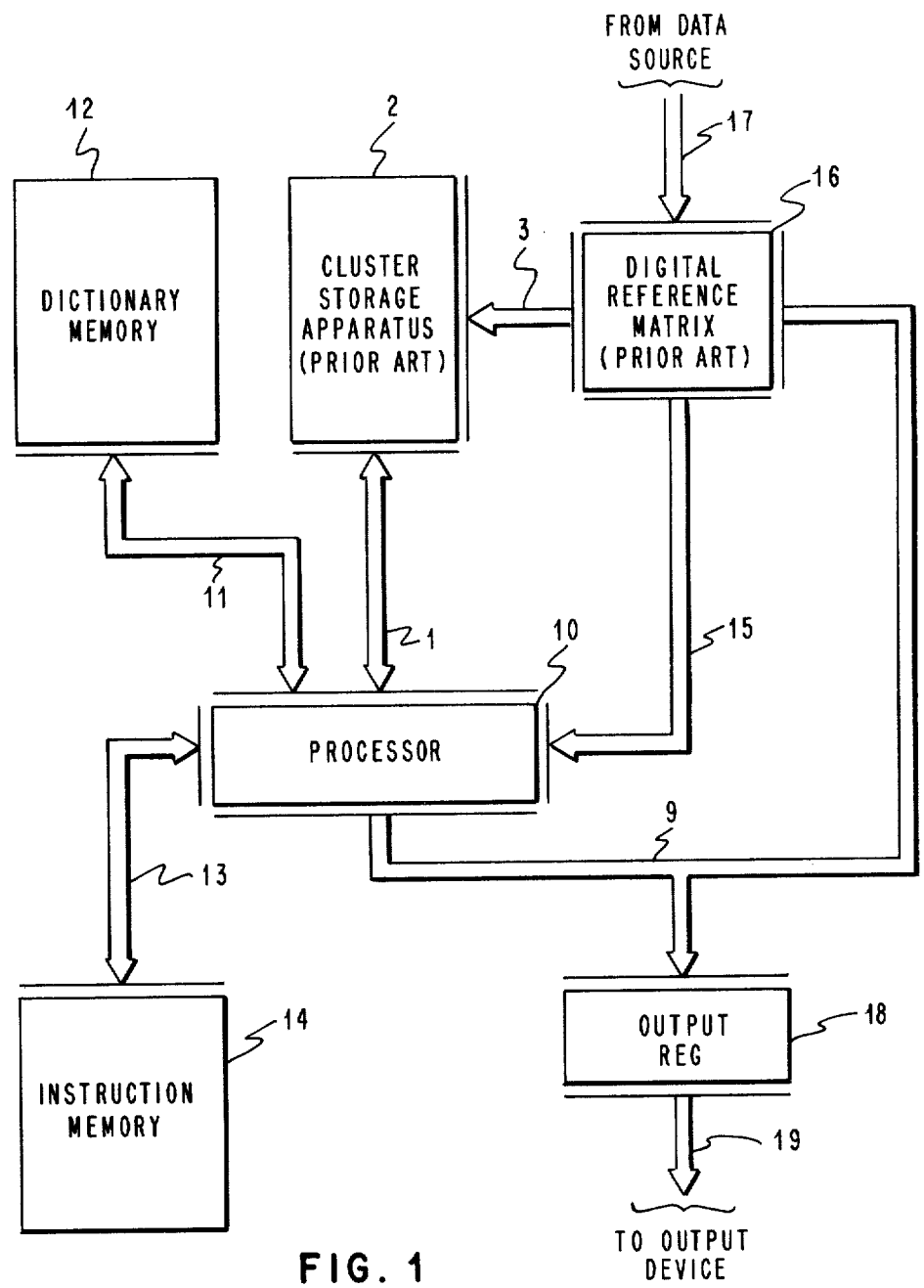
FIG. 1 is a block diagram of some components in the Alpha Content Match System.

Referring to FIG. 1, there is shown a block diagram of the Spelling Correction System which includes a processor or CPU 10 of the general purpose type which is in two-way communication over a bus 13 with a memory 14 containing the instructions which control its operation and define the present invention. The processor 10 is also in two-way communication with the dictionary memory 12 over bus 11 wherein a vocabulary of words is stored.

The processor 10 is also in two way communication over data bus 1 with cluster storage apparatus 2 and in communication with digital reference matrix 16 over bus 15. The cluster storage apparatus 2 is disclosed in U.S. Pat. No. 3,969,698, issued July 13, 1976 to E. W. Bollinger et al, assigned to the same assignee as the present application and expressly incorporated herein by reference. The digital reference matrix 16 is fully disclosed in U.S. Pat. No. 3,995,254 issued Nov. 30, 1976 to W. S. Rosenbaum, assigned to the same assignee as present application and expressly incorporated herein by reference.

Figure 2:
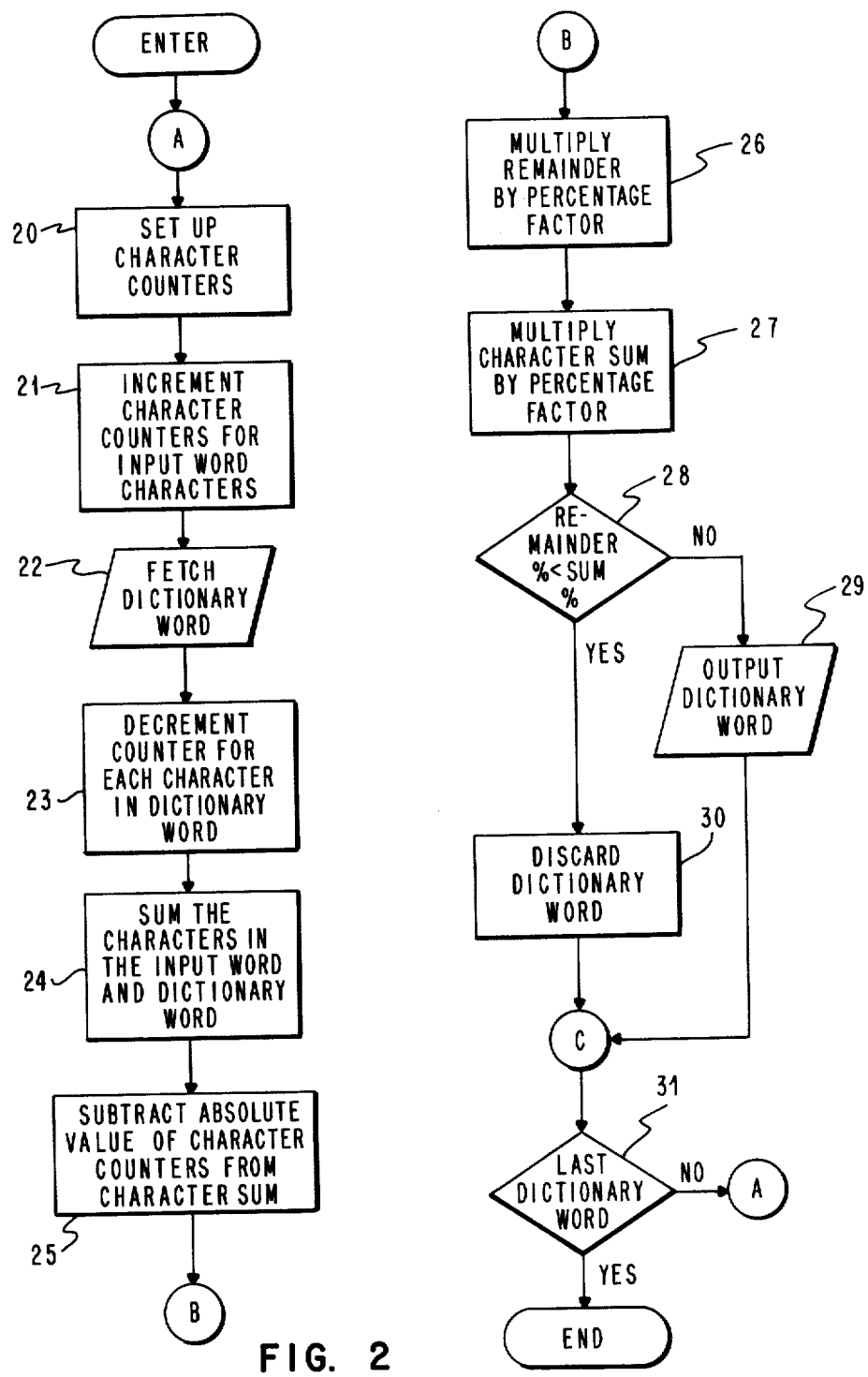
FIG. 2 is a flow chart of the operation of the Alpha Content Match System of this invention.

Text words are input to the system over bus 17 from a conventional data source such as a keyboard or character recognition device. The digital reference matrix has stored therein a dictionary of words in the form of vector representations consisting of a magnitude and an angle for each word. An input word is converted to a vector representation and the magnitude factor is used as an address to access the digital reference matrix memory to determine if an angle is stored therein for the word. If an angle is found in the digital reference matrix 16, at the magnitude address which matches the angle calculated for the input word, then an indication is provided to the processor over bus 15 and the word is output to the output register 18 over bus 9. If no matching angle is found in the digital reference matrix 16, at the magnitude address, or if the calculated magnitude address does not match an address in the digital reference matrix memory, then the input word is considered misspelled and an indication is provided to the processor 10 over bus 15. If the digital reference matrix 16 determines that the word is misspelled, then the characters from the word are passed to the cluster storage apparatus 2 over bus 3 and to the processor 10 over bus 15. The cluster storage apparatus contains groups of alpha characters arranged such that adjacent locations contain alpha characters having similar character recognition misread propensities and keyboard substitution misstroke error propensities. The theory for grouping characters in the cluster storage apparatus is fully disclosed in U.S. Pat. No. 3,969,698. The cluster storage apparatus examines the characters of the input word and outputs a number of words over bus 1 to the processor 10 which are likely candidates for the correct version of the input word. However, as was previously stated in the background section of this application and as is stated in U.S. Pat. No. 3,969,698, the number of words output by the cluster storage apparatus will average about 1% of the words stored in the dictionary. The processor 10 under control of the instructions in instruction memory 14 that define the present invention will further process the output of the cluster storage apparatus using the contents of dictionary memory 12 to produce a number of output candidate words an order of magnitude less than the candidate words produced by the cluster storage apparatus 2. Referring now to FIG. 2 there is shown a flow chart of the operation of the prescan alpha content match algorithm of the present invention. At block 20 a series of counters is set up in memory, one counter for each letter in the alphabet. Additional counters may be set up for special characters that could form a part of the word such as apostrophe. A one is added to each counter that corresponds to a character in the word at block 21. At block 22, each word in a dictionary memory is fetched in turn and its corresponding character values are subtracted from the character counters containing the character values for the input word at block 23. At block 24, a counter is set with a value equal to the sum of the length of the input word and the dictionary word. The absolute value of each alpha counter is then subtracted from the word length counter at block 25. At block 26, the remainder from the counter containing the word length values minus the alpha character counter values is multiplied by a predetermined factor and the length counter value for the total characters in the two words are multiplied by another predetermined factor at block 27. The predetermined factors are selected to set a threshold for which a word is selected from the dictionary memory if it has a number of characters that match the input word greater than or equal to the threshold value. The threshold value may be arbitrarily set. However, it has been discovered that a threshold value of 40% will reduce the number of words output by the cluster storage apparatus by a factor of 10. At block 28 the calculated percentage values are tested to determine if the character match between the input word and the dictionary word exceeds the threshold. The words which exceed the threshold value are output by the processor at block 29 to output register 18 over bus 9 where they are available for analysis on a character by character basis to determine the most likely candidate that is the correct spelling of the input word. The words that do not match the threshold are discarded at block 30. This process is executed for each word in the dictionary as shown at block 31.

Table 1 is a program routine for implementing the prescan alpha content match algorithm of this invention.

TABLE 1

Alpha - Content Match Algorithm

- Enter
- Clear to zero 26 alpha counters (A-Z called the Alpha-Content - Table I (Act I)
- Get the input word for anaysis (candidate)
- Do for each letter in the candidate
- Add one to the Act I counter for this letter in the candidate
- Point to the next letter in the candidate
- Enddo
- Point to the start of the dictionary word list to compare with the candidate
- Move Act I to an Act work-area namely a duplicate copy of Act I (actwork)
- Point to dictionary word list word to be tested
- Do for each letter in the dictionary word list word
- Subtract one from the actwork counter for this letter in the dictionary word list word
- Point to the next letter in the dictionary word list word
- Enddo
- Put into size counter 1 the sum of the length of the candidate and the length of the dictionary word list word
- Copy size counter 1 to size counter 2
- Do for each of the 26 counters in the actwork
- Subtract absolute value of the counter contents from size counter 2
- Point to next counter in actwork
- Enddo
- Multiply size counter 1 by 6
- Multiply size counter 2 by 10
- If size counter 2 is not less than size counter 1 Then
- Flag dictionary word list word as passing the Alpha-Content Match Algorithm and save
- Else
  Flag Dictionary word list as failing the Alpha-Content Match Algorithm and discard
- Endif
- Enddo
- Leave While the invention has been shown and described with reference to a specific set of computer instructions and alpha content match threshold values, it will be understood by those skilled in the art that the spirit of this invention can be implemented in other computer languages and the set of alpha content match threshold values can be modified without avoiding the scope of the invention claimed herein.

What is claimed is:

1. In a process for automatically detecting and correcting misspelled text words, a method for improving the selection from a dictionary memory of the set of correctly spelled target words most nearly equal to the input word without recourse to a character by character positional match comprising the steps of:
   (a) defining a set of counters for each text character;
   (b) incrementing said counters to accumulate a count of the respective characters in the input word;
   (c) decrementing said counters for each character in a target word;
   (d) calculating an absolute value for the remainders in the set of counters;

(e) calculating a threshold value using the combination of the number of characters in the input word and the target word;

(f) calculating a match value for the target word using the common characters between the input word and the target word; and (g) selecting each target word whose match value exceeds the calculated threshold.

2. In a system for automatically detecting and correcting misspelled text words, an improvement for decreasing the size of the set of target text words selected from a dictionary of text words that approximate the correct spelling of the input word without recourse to a positional character by character comparison comprising:

a plurality of counters equal to the set of possible text characters;

means for incrementing said counters to accumulate a count of respective characters within the input word;

means for decrementing said plurality of counters for each character in a target text word;

means for calculating the absolute value of the remainder in said plurality of counters;

means for calculating a threshold value using the combination of the number of characters in the input word and the target text word;

means for calculating a match value for the target text word using the common characters between the input word and the target text word; and means for selecting each target text word whose match value exceeds the calculated threshold value.

* * * * *